US005088347A

United States Patent [19]

Wanlass

[11] Patent Number: 5,088,347

[45] Date of Patent: Feb. 18, 1992

[54] DOOR LOCK ACTUATOR

[75] Inventor: Bert R. Wanlass, Woodland Hills, Utah

[73] Assignee: Auto-Vation Inc., Woodland Hills, Utah

[21] Appl. No.: 449,699

[22] Filed: Dec. 11, 1989

Related U.S. Application Data

[63] Continuation-in-part of Ser. No. 130,715, Dec. 9, 1987, Pat. No. 4,885,954.

[51] Int. Cl.[5] .................. G05G 11/00; F16D 27/04

[52] U.S. Cl. .................. 74/625; 192/84 A; 192/84 B; 292/201

[58] Field of Search .................. 74/625; 192/84 A, 84 B; 292/201

[56] References Cited

U.S. PATENT DOCUMENTS

| | | | |
|---|---|---|---|
| 2,897,933 | 8/1959 | Maurice et al. | 192/84 A |
| 3,653,154 | 4/1972 | Hayday | 192/45 |
| 3,771,785 | 11/1973 | Speyer | 272/84 |
| 3,784,242 | 1/1974 | Hill | 292/336.3 |
| 4,093,289 | 6/1978 | Inabayashi et al. | 292/336.3 |
| 4,135,377 | 6/1979 | Kleefeldt et al. | 70/264 |
| 4,209,213 | 6/1980 | Wussow | 439/28 |
| 4,290,634 | 9/1981 | Gelhard | 292/201 |
| 4,478,445 | 10/1984 | Shimizu | 292/336.3 |
| 4,520,914 | 6/1985 | Kagiyama et al. | 192/71 |
| 4,566,576 | 1/1986 | Moriya et al. | 192/84 C |
| 4,573,723 | 3/1986 | Morita et al. | 292/336.3 |
| 4,616,527 | 10/1986 | Frey et al. | 74/625 |
| 4,685,550 | 8/1987 | Metcalf | 192/67 R |
| 4,706,512 | 11/1987 | McKernon et al. | 74/405 |
| 4,727,301 | 2/1988 | Fulks et al. | 70/278 |
| 4,885,954 | 12/1989 | Wanlass | 74/625 |

FOREIGN PATENT DOCUMENTS

| | | | |
|---|---|---|---|
| 1006679 | 4/1957 | Fed. Rep. of Germany | 192/84 A |
| 2585792 | 2/1987 | France | 192/84 A |
| 1336020 | 11/1973 | United Kingdom | 292/201 |

*Primary Examiner*—Allan D. Herrmann

*Attorney, Agent, or Firm*—Dykema Gossett

[57] ABSTRACT

The present invention relates to a power door lock actuator for use on a standard door lock system. The actuator operates quietly, has zero back drive and can be mounted on all vehicle types without retooling for each vehicle. The door lock actuator has an arcuately mounted output arm, an attaching portion on the arm, a power source and a clutch to selectively couple the output arm and the motor.

19 Claims, 5 Drawing Sheets

DOOR LOCK ACTUATOR

This is a continuation-in-part of copending application Ser. No. 07/130,715 filed on 12/9/87, now U.S. Pat. No. 4,885,954.

BACKGROUND OF THE INVENTION

The present invention relates to a vehicle power door lock actuator. More particularly, the present invention relates to a power door lock actuator that operates quietly, has substantially zero back drive and can be mounted on all vehicle types without extra tooling for each type vehicle.

Standard door lock systems include a manual door lock button, a key entry, a locking mechanism and a connecting rod for interconnecting the button, key entry and locking mechanism. By manually pulling or pushing the locking button or operating the key entry, the door can be locked or unlocked.

Power door lock actuators of the general type do the pushing or pulling of the locking mechanism by the flip of a switch. Generally, the power actuator has an electric motor coupled to an output member that is connected to the door lock system. When the motor is energized, the output member is driven to automatically lock or unlock the door. An example of a common door lock actuator is disclosed in U.S. Pat. No. 3,954,016 of which the Applicant of the present invention was a co-inventor. The disclosed actuator has an output member 11 attached at one end to a manually-operated push button 28 with a rack section 100 at the other end connected to a motor 32 through a pinion gear 88. When motor 32 is energized at switch 90, the output member 11 extends or retracts in a linear path with respect to housing 31 to lock or unlock the door. A concentric guide roller 74 is provided to maintain proper alignment of the pinion gear 88 with respect to rack section 100.

Ideally, a power actuator should operate quietly and allow easy manual operation of the lock system. Although ideal, in actual practice quiet operation and easy manual operation are for the most part mutually exclusive. Quiet operation is obtained at the expense of manual operation, while easy manual operation is obtained at the expense of quiet operation.

A power actuator can be designed to operate quietly. This is typically accomplished by having a large gear ratio between the motor and output arm which slows down the movement of the system, thereby reducing noise. By slowing the speed of actuation, sudden impact of the door lock and actuator mechanisms are eliminated reducing noise and damage to the system. The disadvantage to using a large gear ratio is the resistance it gives to manual operation. This resistance to manual operation of the actuator is commonly referred to as "back-drive" which ideally should equal or at least closely approach zero. With zero back-drive, there is no resistance to manual operation of the door locks due to the actuator.

Back-drive can be reduced in the door lock actuator by using a small gear ratio or direct drive between the motor and the output arm. A disadvantage to this design is an increase in the speed of operation resulting in louder operation noises and damage to the system. Although back-drive is reduced, the actuator is louder. Another disadvantage to using smaller gear ratios or direct drive is the need for a larger motor to provide the necessary torque to operate the lock system. Larger motors weigh more, pull greater amperage, require larger, more costly wiring, necessitate the use of a relay and can encounter voltage drop problems.

The problem of back-drive is also related to magnetic cogging of the motor and the gear ratio of the actuator. Cogging is the resistance that is due to the magnetic flux of the electric motor resisting rotation of the rotor past the magnetic field. Cogging will vary with the size of the motor and its effect on manual operation will be amplified by the gear ratio used. With a smaller motor, the magnetic field is smaller; however, a larger gear ratio is needed to operate the system. The increased gear ratio increases resistance to manual operation because it effectively increases the cogging of the electric motor. A larger motor inherently has increased cogging and even though the cogging is not further amplified by the gear ratio, it contributes to back-drive.

SUMMARY OF THE INVENTION

Applicant's invention solves the above problems by providing a power actuator that has a small motor, zero back drive and operates slowly to reduce, if not eliminate, noise and the associated problems of wear and damage.

The door lock actuator of the present invention has an output member or output arm, a power means, preferably an electric motor, and a clutch for selectively coupling the arm to the motor. In the preferred embodiment, the output arm is attached to the connecting rod of the lock system and moves through an arcuate path between first and second positions that correspond to the locked and unlocked positions of the door-locking mechanism. Normally, the motor and output arm are disengaged by the clutching mechanism to allow easy manual operation of the door-locking system. When disengaged, there is zero back drive from the power actuator. To operate the power actuator, the electric motor is energized, and the clutching means engaged to couple the energized motor to the output arm to automatically lock or unlock the door.

The clutching means of the preferred embodiment has a clutch disc connected through a pinion gear to the output arm and a drive assembly connected through a ring gear to the motor. The clutch disc and drive assembly are both rotatably mounted. Additionally, the clutch disc is mounted for axial movement for engagement with the drive assembly. An electromagnet is mounted within the drive assembly for magnetically drawing the clutch disc into engagement with the drive assembly to couple the motor to the output arm. A biasing means is positioned between the clutch disc and drive assembly to urge them apart when the electromagnet is disengaged. In this way, the power actuator is normally disengaged from the door lock system so that manual operation is not resisted. When energized, the motor, through the ring gear, rotates the drive assembly while the electromagnet pulls the clutch disc into engagement with the drive assembly, thereby providing the power to move the output arm between the first and second positions.

Due to the clutching means, a large gear ratio and a small motor can be used without creating back-drive problems. In fact, the gear ratio can be substantially increased and the motor size substantially decreased. The increased gear ratio allows extremely slow operation resulting in virtually no noise from the locking system. In the preferred embodiment, the actuator takes approximately 300 milliseconds to lock or unlock the vehicle door while Applicant's prior actuator disclosed in U.S. Pat. No. 3,954,016 takes approximately 20 milliseconds. The present invention operates approximately 15 times slower than its predecessor. Further, the motor of the present invention is a micro-motor which is substantially smaller than conventional motors used in door lock actuators. For example, a typical motor used in door lock actuators may have a stall torque of approximately 10–14 in. oz. while the present actuator uses a motor having a stall torque of approximately 0.8 in. oz. The micro-motor of the present invention has less power, therefore it can be a continuous duty motor obviating the need for a circuit breaker. Larger motors pull more amperage which causes the motors to heat rapidly necessitating the use of a circuit breaker. Additionally, smaller motors cost less, weigh less and have smaller wiring requirements.

A further advantage of the present invention is that the output arm can function as a moment arm to further amplify the output torque of the motor. The output arm has a fulcrum with a sector gear extending from one side and an attaching arm extending from the opposite side. By adjusting the length of the sector gear and attaching arm with respect to one another an amplification of the effective force at the working end of the output arm can be obtained.

A still further advantage of the present invention is the method of mounting the output arm to the lock system. The output arm has a mounting head which permits standardization of the power actuator for different vehicle types and èliminates the need for retooling each vehicle type. The mounting head has an axial bore extending through it with a slot intersecting the axial bore. To attach the actuator, the slot is coaxially aligned with the connecting rod, and the connecting rod is then inserted. Thereafter, the actuator is rotated to allow the connecting rod to enter the axial bore where it is retained. The actuator can then be bolted or otherwise mounted to the door. In the preferred embodiment, to facilitate mounting, the connecting rod has an offset portion for mounting purposes.

Other advantages and meritorious features of the present invention will be more fully understood from the following description of the invention, the appended claims, and the drawings, a brief description of which follows.

DETAILED DESCRIPTION OF THE INVENTION

Figure 1:
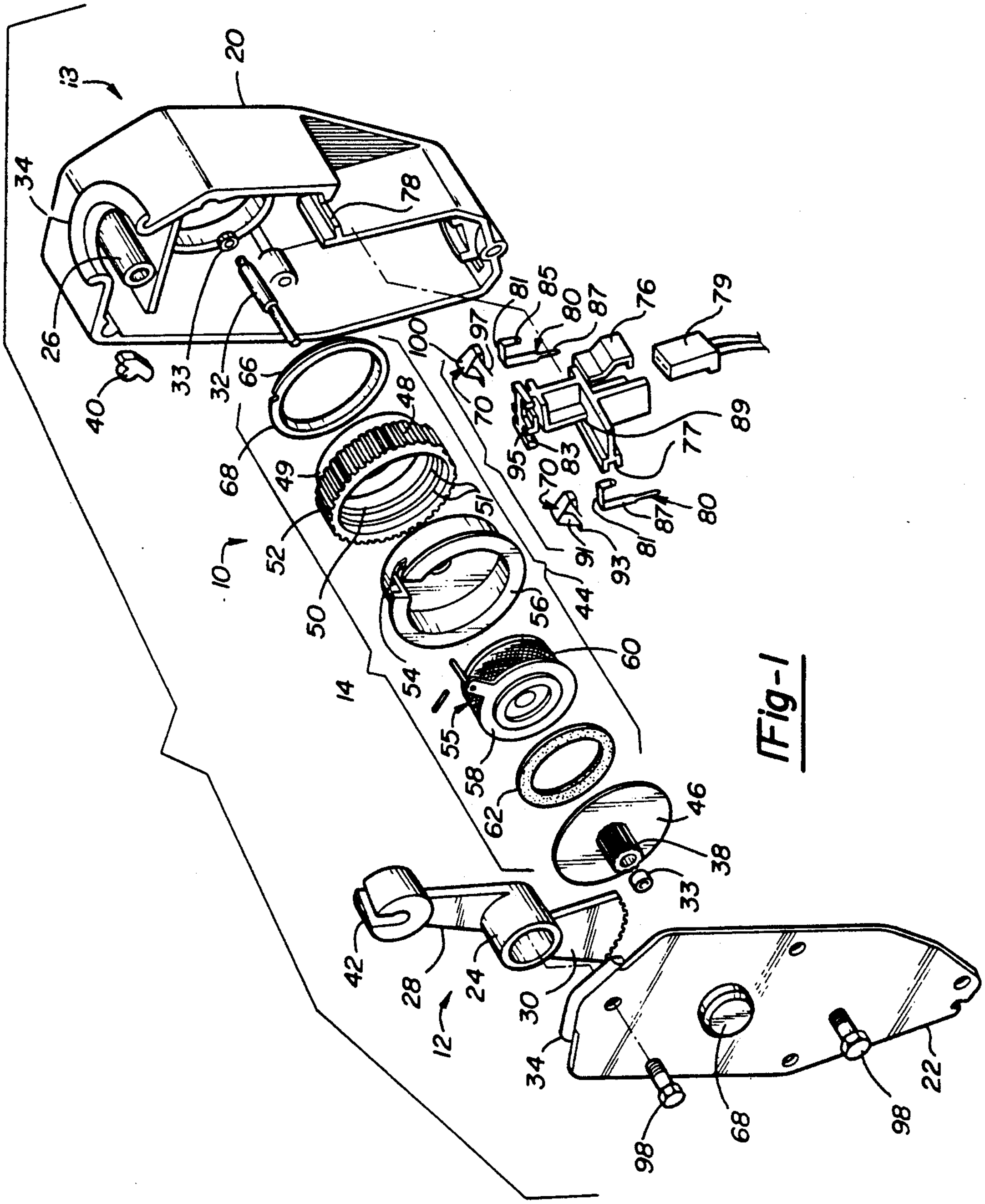
FIG. 1 is an exploded perspective view of the door lock actuator of the present invention.
Figure 8:
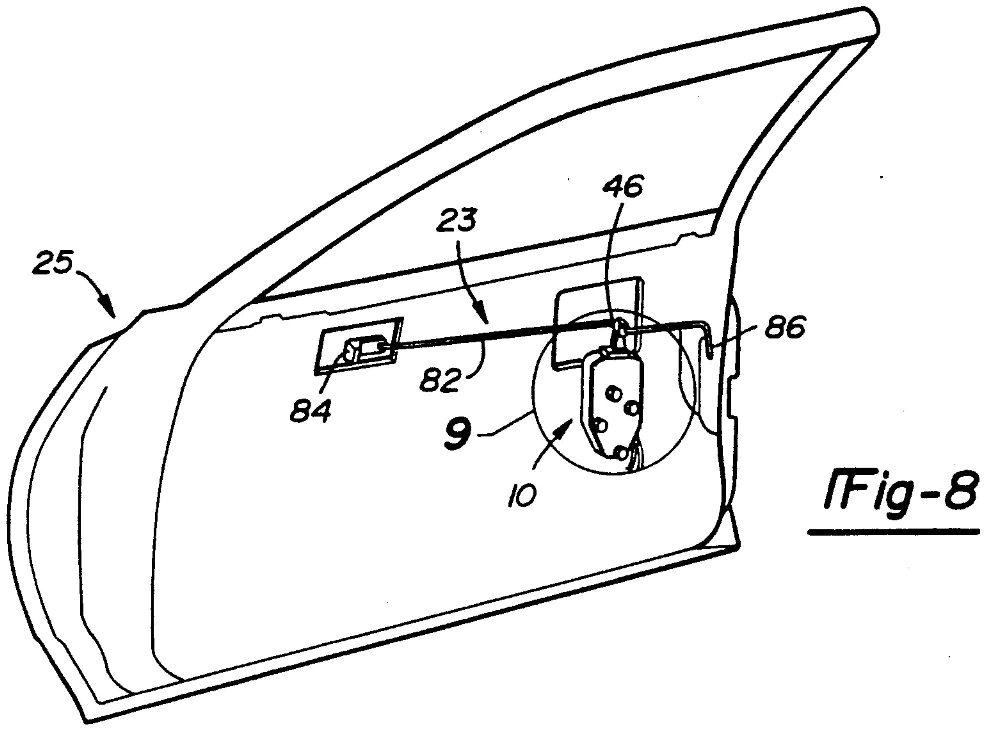
FIG. 8 is a perspective view of a typical vehicle door with the door lock actuator of the present invention mounted thereon.

With reference to FIG. 1, the door lock actuator of the present invention is shown generally at 10. Actuator 10 includes a housing 18 having a base 20 and cover plate 22 with an output arm 12, clutching assembly 14 and power means 16, preferably an electric motor, mounted inside. (see FIG. 2). With reference to FIG. 8, the power actuator 10 is shown mounted to a door-locking system 23 of a typical vehicle door 25. The manner in which power actuator 10 is mounted will be discussed in greater detail below.

Figure 3:
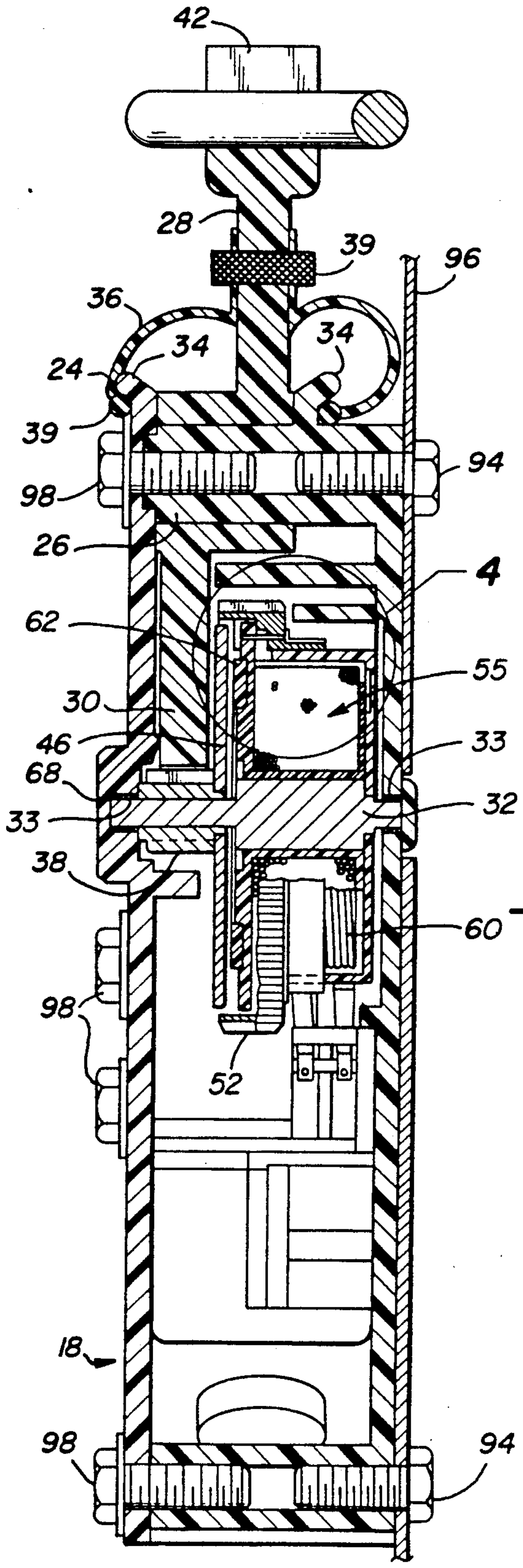
FIG. 3 is a cross-sectional side view of the door lock actuator of the present invention.

In the preferred embodiment, output arm 12 of actuator 10 is mounted for arcuate movement within housing 18. Arm 12 includes a hub 24, attaching arm 28 and a sector gear 30. Hub 24 is rotatably mounted upon a boss 26 which protrudes from base 20 and is maintained axially upon boss 26 by mounting ears 34 which extend from base 20 and cover plate 22. As shown in FIGS. 1 and 3, attaching arm 28 extends from one side of hub 24 for attaching the actuator 10 to the locking system 23 and sector gear 30 extends from the other side of hub 24 for coupling actuator 10 to a pinion gear 38 which forms part of the clutching mechanism 14.

Figure 2:
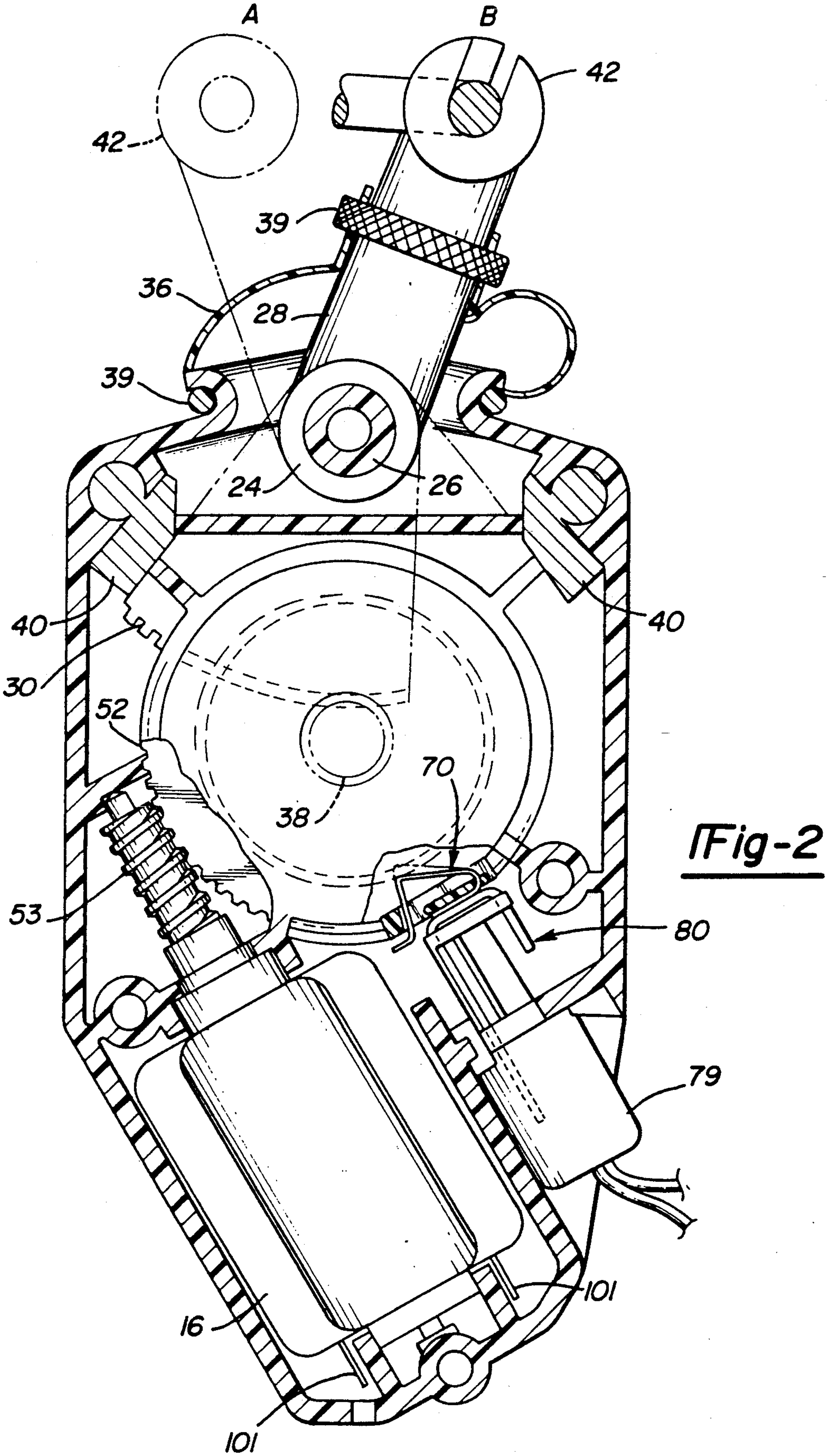
FIG. 2 is a cross-sectional plan view of the door lock actuator of the present invention.

With reference to FIG. 2, the arcuate movement of output arm 12 is illustrated. As shown, arm 12 rotates between a first position A and a second position B which correspond to the locked and unlocked positions of locking system 23. Rubber stops 40 are provided to cushion the end of travel of arm 12 to reduce noise and damage to the actuator and locking system. A rubber boot 36 is provided to enclose the actuator housing 18 to prevent contaminants from entering the interior of housing 18. Boot 36 has bands 39 to attach it to mounting ears 34 and attaching arm 28.

The arcuately mounted output arm 12 of the present invention permits travel of arm 12 to be changed and the output force of actuator 10 to be varied. By changing the length of output arm 12, actuator 10 can be modified for different applications of travel and output force. For example, in the preferred embodiment at 0.8 inches of travel, actuator 10 will generate approximately seven pounds of force. If the actuator travel is reduced to 0.4 inches, preferably by shortening the length of the output arm 28, the actuator will provide 14 pounds of output force. At a travel of 1.6 inches, the output force is 3.5 pounds. In this way, the actuator can be readily changed for universal adaptation to many different applications.

Additionally, the output member 12 of the present invention can function as a simple lever arm with the hub 24 being the fulcrum. This would be accomplished by adjusting the length of arm 28 with respect to the radial length of sector gear 30. The applied torque acting through pinion gear 38 is transferred to sector gear 30 with an amplification of the effective force at attaching head 42. Since the effective force is amplified, less torque must be applied at sector gear 30, allowing a smaller motor to be used. The advantage of the output arm acting as a lever arm becomes more apparent when the present actuator is compared to common actuators such as the actuator disclosed in U.S. Pat. No. 3,954,016 (hereinafter referred to as the '016 actuator). Output member 11 of the '016 actuator moves in a linear path. The force necessary to move output member 11 must be produced at the pinion gear 88 without the benefit of amplification. Thus, the '016 actuator requires more torque at the pinion gear to move the output member than would be required by actuator 10 of the present invention acting as a simple lever. In this way, the present actuator can use a smaller power means or motor because the torque necessary to produce enough force to move the output member is less.

With reference to FIG. 1, the clutching assembly 14 of the preferred embodiment will be described. Assembly 14 has a clutch disc 46 and a driving assembly, shown generally at 44. Both are mounted in axial alignment on a shaft 32. Shaft 32 is journaled in bearings 33 so that it can freely spin. Drive assembly 44 is fixed to shaft 32 and spins with it while clutch disc 46 freely rotates and moves axially with respect to shaft 32. As will be described more fully below, drive assembly 44 contains an electromagnet to magnetically engage drive assembly 44 with clutch disc 46. A biasing means 64, which in the preferred embodiment is a warp spring, normally separates plate 46 and drive assembly 44.

Clutch disc 46 includes a pinion gear 38, which in the preferred embodiment is press-fit or otherwise affixed to one side of disc 46. The axial length of pinion gear 38 is long enough to maintain continued contact with sector gear 30 throughout the extent of axial movement of clutch disc 46. Preferably, clutch disc 46 is made of a soft, low-carbon steel, such as for example S.A.E. 1008, and pinion gear 38 is made of nylon, such as DUPONT ZYTEL S.T. 801. Alternatively, disc 46 can be formed of plastic or nylon with metal added so that it is magnetic. As disclosed in Applicant's patent application Ser. No. 130,715, now U.S. Pat. No. 4,885,954, a metal ring having a series of holes therein to facilitate bonding to plate 46 could be used.

With reference to FIGS. 1, 4, 5 and 6, the driving assembly 44 will now be described. Drive assembly 44 includes a gear assembly 48 which has a plurality of gear teeth 52 mounted upon or integrally formed upon a hub 57. Hub 57 has a flange portion 49 and an interior portion 50 which has step surfaces 51 therein. Hub 57 is configured to mount directly upon shaft 32 and to rotate with shaft 32. A housing 54 and electromagnet 55 are mounted in the interior of gear assembly 48. Housing 54 has a flange portion 56 which is received within the interior-most step portion 51 of hub 57. The electromagnet 55 is received within housing 54 and includes a spool 58 upon which wire 60 is wrapped to form the electromagnet. Gear assembly 48 and spool 58 are preferably made of nylon, such as for example DUPONT ZYTEL S.T. 801. The preferred method of providing electricity to the electromagnet will be described more fully below.

Mounted to the face of spool 58 is a clutch pad 62. Pad 62 is preferably made of an SBR elastomer having a hardness of Shore A70. The clutch pad provides friction between clutch disc 46 and electromagnet 55 when they are engaged. The combination of clutch pad 62 and electromagnet 55 provides a self-compensating clutch system. As clutch pad 62 wears, the electromagnetic attraction between electromagnet 55 and clutch disc 46 increases due to the two elements being closer together because of the wear on pad 62. As should be appreciated, as pad 62 continues to wear, the elements get closer to each other, increasing the magnetic attraction between them and compensating for pad wear.

The electromagnet 55 is supplied electricity through electric brushes 70 which contact and ride upon a slip ring 66 mounted upon flange 49 and housing 54 respectively. Slip ring 66 and housing 54 are formed of conductive material or at least coated with a conductive material. Preferably, housing 54 is made of soft, low-carbon steel, such as for example SAE 1008 steel, and ring 66 is formed of brass, such as for example 70 percent cartridge brass, SAE CA260 and 30 percent sheet brass, gage number 30. Ring 66 and housing 54 are insulated from each other by flange 49.

The current supplied by brushes 70 flows to the wire 60 of electromagnet 55 through pins 72 which are wrapped with leads from the wire 60 and soldered to the slip ring 66 and housing 54 respectively. In the preferred embodiment, slip ring 66 includes a flange 68 to which pin 72 is soldered at 71. In the disclosed embodiment, bosses 74 are provided on spool 58 to facilitate mounting of pins 72. These bosses have openings for receipt of pins 72. The first pin 72 extends through openings in hub 57 and housing 54 where pin 72 is soldered to slip ring 66. The second pin 72 extends through an opening in housing 54 and is soldered to housing 54. In this way, electric current can be supplied through brushes 70 to housing 57 and slip ring 66 to flow through coil 60 to power electromagnet 55.

Figure 5:
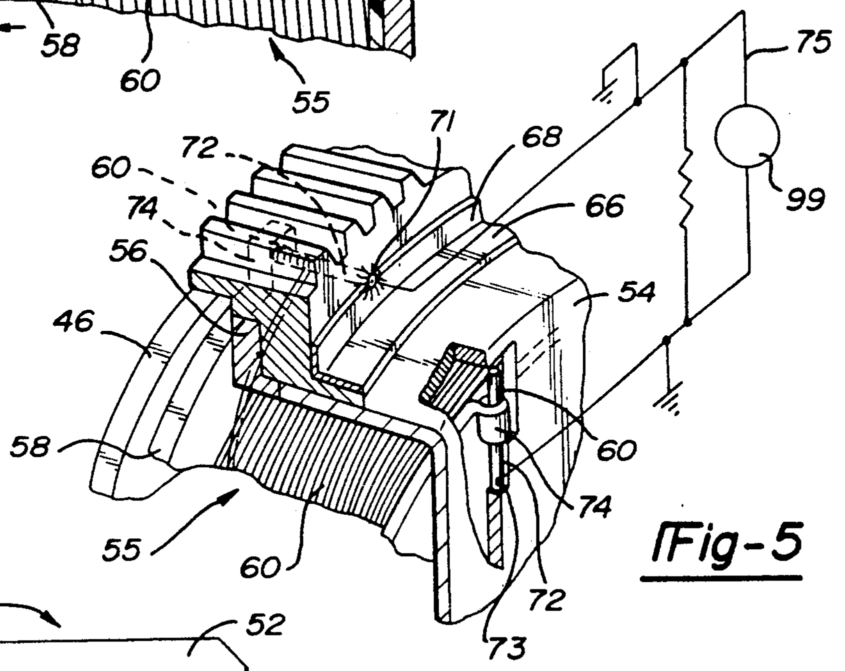
FIG. 5 is a perspective view of FIG. 4.
Figure 6:
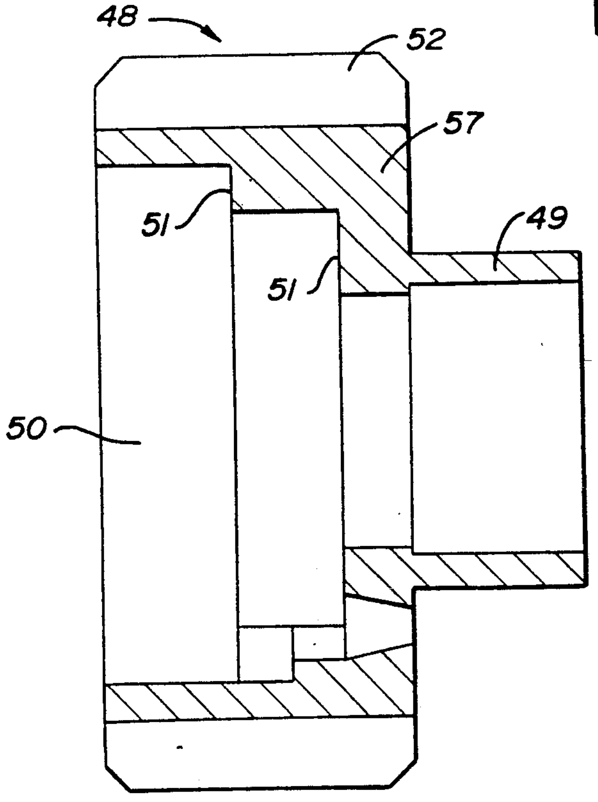
FIG. 6 is a cross-sectional side view of the drive gear of the present invention.

In FIG. 5, an electric schematic 75 is illustrated showing a power supply 99 interconnected to pins 72. It should be understood that this power supply is schematically showing power to pins 72; however, the electric current would be supplied through brushes 70. As shown, either pin 72 can act as a positive or a negative depending upon the direction current flows from power source 99.

In the disclosed embodiment, brushes 70 are mounted within a connector body 76. Connector body 76 has a mounting track 77 for mounting connector body 76 to boss 78 in housing 20. Once connector body 76 is mounted in housing 20, it can receive an electrical plug 79 from the automobile's electric system. Plug 79 is a standard electrical connecting plug used in automobiles.

Connector body 76 includes a pair of prongs 80 which are generally U-shaped having a base 81, leg 87 and foot 85 for mounting the prongs 80 in a pair of lateral slots 83 in connector body 76. Base 81 fits within slot 83 with foot 85 extending over one end of slot 83 and leg 87 extending over the other end of slot 83 and through openings 89. Prongs 80 are adapted to receive electrical plug 79 in order to supply current to brushes 70. Brushes 70 have a leg portion 91 and foot 93 which are mounted within longitudinal slots 95 in connector body 76 and a leg portion 97 which is received within slots 83 to contact prongs 80. The base 100 of brushes 70 extends outwardly from the end of connector body 76. Due to the shape of brushes 70, they are flexible between leg 96 and base 100 so that they can flex with respect to ring 66 and housing 54 to maintain continuous contact and flow of electric current to electromagnet 55. Due to the mounting arrangement in connector body 76, the flexing is permissible because leg 91 and foot 93 are free to move within longitudinal slot 95.

In the preferred embodiment, gear 48 is made of nylon to reduce noise and has a diametral pitch of 48. Worm gear 53, in the preferred embodiment, is a double start worm gear and has a diametral pitch of 48. Coupling worm gear 53 with gear 48 provides a gear ratio of 32:1 which is extremely high when compared to standard door lock actuators. Due to this ratio, the door lock actuator operates very slowly reducing if not eliminating noise and damage and permits a much smaller motor to be used. However, this extremely high gear ratio does not effect back-drive because the output arm 12 is normally disengaged from gear 48 and motor 16 when the actuator 10 is not energized.

In operation, the electric motor 16 is energized, which causes driven gear 48 and shaft 32 to rotate through the rotation of worm gear 53. Simultaneously, the electromagnet 55 is energized, which magnetically draws clutch disc 46 into engagement with electromagnet 55 against the bias of biasing means 64. To facilitate the clutching action of clutch 46, clutch pad 62 is provided on spool 58 to engage clutch disc 46.

The electrical leads 101 of motor 16 are received within connector body 76 and supplied power from electrical plug 79. As can be appreciated by one of ordinary skill in the art, motor 16 is reversible, and the direction of gear 53 is determined by the direction of current flowing to motor 16. Because the current is flowing to both the motor and electromagnetic 55 simultaneously, electromagnet 55 must be capable of operating regardless of the direction of flow of current. As described above, the connection of electromagnet 55 through slip ring 66 and housing 54 permits the flow of current to be reversed without affecting electromagnet 55. In the preferred embodiment, the total four-door system amperage draw is approximately four amps. The typical system amperage draw for door lock actuators is approximately 30 amps. Because of the low amperage draw of the present invention, the elimination of relays becomes practical with the operation of the motor through transistors being practical and preferred. Further, the lower amperage reduces the system's wire size, cost and overall weight.

Figure 7:
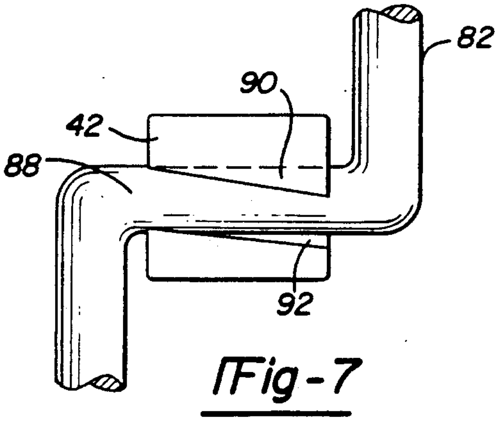
FIG. 7 is a view of the mounting head and connecting rod of the present invention.
Figure 4:
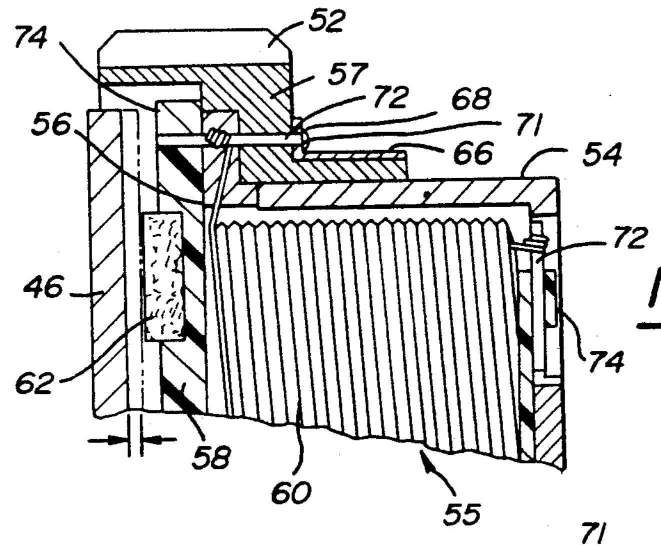
FIG. 4 is an enlarged view of the area in FIG. 3 enclosed by the circle and identified by the numeral 4.
Figure 9:
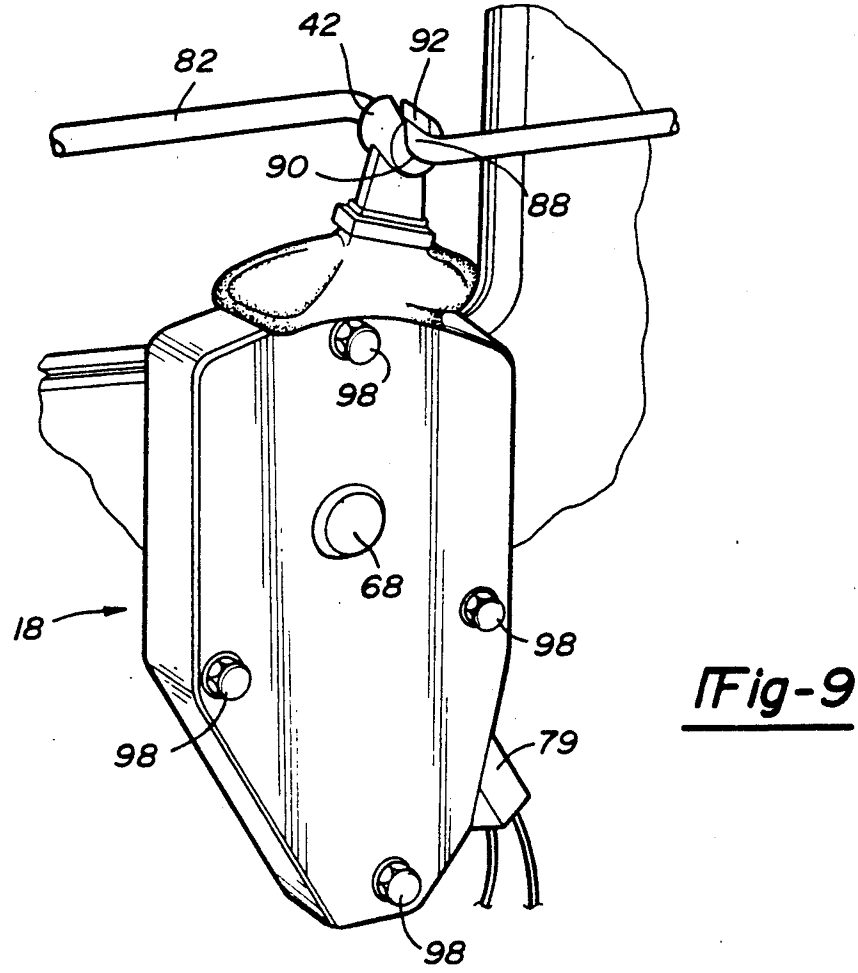
FIG. 9 is a perspective view of the door lock actuator of the present invention mounted on the connecting rod.

With reference to FIGS. 7, 8 and 9, the attaching head 42 and method of mounting the door lock actuator 10 of the present invention will be described. The locking system 23 of a typical vehicle door 25 is illustrated in FIG. 8 for purposes of explanation only. Other door locking systems are known, and actuator 10 of the present invention is intended for use on all systems. The illustrated system 23 includes a connecting arm 82 interconnecting a manual locking button 84 with a locking mechanism 86. The manual locking button may be pushed or pulled to lock or unlock the door.

The actuator 10 of the present invention has a mounting head 46 for attachment to the connecting arm 82. To standardize the actuator for use on any vehicle type, the control arm is preferably provided with an offset portion 88, see FIG. 9. The attaching head 47 has an axially-extending bore 90 with an intersecting slot 92 which intersects at an acute angle to axial bore 90. To mount actuator 10, the offset portion 88 is inserted into slot 92, then the actuator is rotated so that offset portion 88 is received within axial bore 90. Thereafter, bolts 94 are threaded through mounting panel 96 to retain actuator 10. Additional bolts 98 are used to mount cover plate 22 to housing 18. As is apparent, actuator 10 has an insensitive mounting position allowing it to be mounted in any orientation with respect to offset 88. The direct attachment of actuator 10 to the control rod eliminates remote mounting components and related costs in tooling and eliminates the extra tooling required for car-to-car applications. In this manner, the mounting of actuator 10 can be standardized by merely offsetting the connecting arm 80 for receipt of attaching head 42.

The operation of actuator 10 will now be described. It is important in any vehicle having a power door lock actuator to also have the capability of easy manual or key operation of the lock system. Actuator 10 of the present invention is normally disengaged from the motor 16 so that there is no back drive. The clutch disc 46 is normally separated from drive gear assembly 44 by biasing means 64. In the normal condition, manual button 84 or a key lock (not shown) can be easily manipulated because there is no back drive from actuator 10. To operate actuator 10, a switch or button located inside the passenger compartment is actuated which energizes motor 16 and electromagnet 55 through electrical connector 101. Motor 16 through worm gear 53 drives driven gear 48 while the electromagnet 55 pulls clutch disc 46 into engagement with clutch pads 62. Upon engagement, clutch disc 46 rotates upon shaft 32 at the same speed as driven gear 48. This rotation is applied as a torque to the sector gear 30 of output arm 12 through pinion gear 38 causing arm 12 to rotate upon boss 26. The arcuate travel of output arm 12 is controlled by rubber stops which also reduce noise in the system. In this way, a power door lock actuator is provided which has zero back drive slow operation and has substantially noiseless operation.

It should be understood that the preferred embodiment of the present invention has been described as a single unit including each of the features discussed. However, it is within the intended scope of the invention that each feature or a combination of features may be used separately. For example, the clutching assembly 14 and power means 16 may be used with an output arm which moves linearly instead of arcuately. Furthermore, the arcuately mounted output arm 12 may be used with conventional types of power means without the clutching assembly. Still further, the clutching assembly may include other mechanisms to disengage the power means from the output arm.

It will be apparent to those skilled in the art that the foregoing disclosure is exemplary in nature rather than limiting, the invention being limited only by the appended claims.

What is claimed is:

1. A door lock actuator for use in a vehicle having a door lock, a manual lock control, and a connecting arm interconnecting the door lock and the manual lock control so that upon manual operation of said manual lock control, said door lock is locked and unlocked, said actuator comprising:

a housing;

a power means;

an output member pivotally mounted to said housing, said output member having first and second ends with said first end being adapted for connection to said connecting arm and said second end having a first gear means thereon;

a clutch disc having first and second sides and a second gear extending outwardly from said first side of said clutch disc for coupling said clutch to said first gear of said output member, with at least said second side of said clutch disc being ferro-magnetic, said clutch disc being slidable with respect to said output member;

a worm gear connected to said power means;

a drive assembly for driving said clutch disc, said drive assembly including a third gear interconnected to said worm gear and an electromagnet interconnected to a power source, said power source including a contact ring mounted to said third gear and interconnected to said electromagnet and a second housing for housing said electromagnet, said second housing being interconnected to said electromagnet and insulated from said contact ring and a pair of electrical brushes contacting said contact ring and said second housing respectively to supply electric current to said electromagnet;

said driven gear and said clutch means being coaxially mounted, said clutch disc being magnetically drawn to said driven gear upon actuation of said electromagnet to couple to said output member to said power means upon actuation of said door lock actuator;

said brushes are mounted in a connector body, said connector body having a pair of grooves extending laterally across said connector body with each of said grooves being open at both ends, and a pair of prongs that are substantially U-shaped to define a base, a leg and a foot for mounting in said connector body, said base of each of said prongs being received in said grooves with said foot extending over one end of said groove and said leg extending over the other end of said groove, said brushes being received within said connector body in engagement with said body portion of said prong whereby electric current can flow through said prong into said brushes to said electromagnet.

2. The actuator of claim 1, wherein said first gear means is a sector gear and said second gear means is a pinion gear in operable engagement with said sector gear.

3. The actuator of claim 1, further including a biasing means positioned between said driven gear and said clutch disc.

4. The actuator of claim 1, wherein said ring and said second housing are electrically connected to said electromagnet by wire leads extending from said electromagnet and attached to pins, said pins being connected to said ring and said second housing.

5. The actuator of claim 1, wherein said electrical brushes are interconnected to an electrical connector which includes contact prongs having first and second ends, said first end being in engagement with said brushes and said second end being free and adapted to be plugged into a power supply plug.

6. The door lock actuator of claim 1, wherein said first end of said output member includes an attaching means having a mounting head with a longitudinal bore extending therethrough and a slot intersecting said longitudinal bore at an angle thereto such that said attaching means is mountable to said control arm by first inserting said control arm into said slot, then rotating said actuator so that said control arm is received and retained within said longitudinal bore.

7. The door lock actuator of claim 1, wherein said electromagnet includes a pair of pins, each of which is wrapped with a lead from the electromagnet, said pins being interconnected to said contact ring and second housing respectively, such that either pin is positive or negative depending upon the current flow.

8. The actuator of claim 1, wherein said brushes are configured such that they are flexible to ensure contact between said brushes, said prongs and said electromagnet.

9. The invention of claim 1, wherein a clutch pad means is positioned between said clutch disc and said drive assembly.

10. A door lock actuator for use in a vehicle having a door lock, a manual lock control, and a connecting arm interconnecting the door lock and the manual lock control so that upon manual operation of said manual lock control, said door lock is locked and unlocked, said actuator comprising:

a housing;

a power means;

an output member pivotally mounted to said housing, said output member having first and second ends with said first end being adapted for connection to said connecting arm and said second end having a first gear means thereon;

a clutch disc having first and second sides and a second gear extending outwardly from said first side of said clutch disc for coupling said clutch to said first gear of said output member, with at least said second side of said clutch disc being ferro-magnetic, said clutch disc being slidable with respect to said output member;

a worm gear connected to said power means;

a driving assembly for driving said clutch disc, said driving assembly including a third gear interconnected to said worm gear and an electromagnet therein, said electromagnet having a nonmetallic face adjacent said second side of said clutch disc such that said clutch disc engages a nonmetallic surface;

said third gear and said clutch disc being coaxially mounted, said second side of said clutch disc being magnetically drawn to said third gear upon actuation of said electromagnet to couple said output member to said power means upon actuation of said door lock actuator;

said electromagnet is interconnected to a power source, said power source including a contact ring mounted to said third gear and interconnected to said electromagnet and a second housing for housing said electromagnet, said second housing being interconnected to said electromagnet and insulated from said contact ring and a pair of electrical brushes contacting said contact ring and said second housing respectively to supply electric currents to said electromagnet;

said brushes are mounted in a connector body having a pair of grooves extending laterally across said connector body with each of said grooves being open at both ends, said connector body including a pair of prongs that are substantially U-shaped to define a base, a leg and a foot for mounting in said connector body, said base of each of said prongs being received in said grooves with said foot extending over one end of said groove and said leg extending over the other end of said groove, said brushes being received within said connector body in engagement with said body portion of said prong whereby electric current can flow through said prong into said brushes to said electromagnet.

11. The actuator of claim 10, wherein said first gear means is a sector gear and said second gear means is a pinion gear in operable engagement with said sector gear.

12. The actuator of claim 10, further including a biasing means positioned between said driving assembly and said clutch disc to normally bias said driving assembly and clutch disc apart.

13. The actuator of claim 10, wherein said contact ring and said second housing are electrically connected to said electromagnet by wire leads extending from said electromagnet and attached to pins, said pins being connected to said contact ring and said second housing.

14. The actuator of claim 10, wherein said electrical brushes are interconnected to an electrical connector which includes contact prongs having first and second ends, said first end being in operative engagement with said brushes and said second end being free and adapted to be plugged into a power supply plug.

15. The actuator of claim 10, wherein said first end of said output member includes an attaching means having a mounting head with a longitudinal bore extending therethrough and a slot intersecting said longitudinal bore at an angle thereto such that said attaching means is mountable to said control arm by first inserting said control arm into said slot, then rotating said actuator so that said control arm is received and retained within said longitudinal bore.

16. The invention of claim 10, wherein a clutch pad means is positioned between said clutch disc and said driving assembly.

17. A door lock actuator for use in a vehicle having a door lock, a manual lock control, and a connecting arm interconnecting the door lock and the manual lock control so that upon manual operation of said manual lock control, said door lock is locked and unlocked, said actuator comprising:

a housing;

a shaft journaled within said housing;

a power means;

an output member pivotally mounted to said housing, said output member having first and second ends with said first end being adapted for connection to said connecting arm and said second end having a first gear means thereon;

a clutch disc having first and second sides and a second gear extending outwardly from said first side of said clutch disc for coupling said clutch to said first gear of said output member, with at least said second side of said clutch disc being ferro-magnetic, said clutch disc being slidable with respect to said output member, said clutch disc and second gear being rotatably mounted upon said shaft that said clutch disc and second gear freely rotate thereon;

a worm gear connected to said power means;

a driving assembly for driving said clutch disc, said driving assembly including a third gear interconnected to said worm gear and an electromagnet thereon, said electromagnet having a non-metallic face adjacent said clutch disc; said driving assembly being fixedly attached to said shaft such that said driving assembly rotates with said shaft;

said third gear and said clutch disc being coaxially mounted, said clutch disc being magnetically drawn to said third gear upon actuation of said electromagnet to couple said output member to said power means upon actuation of said door lock actuator;

said brushes are mounted in a connector body having a pair of grooves extending laterally across said connector body with each of said grooves being open at both ends, said connector body including a pair of prongs that are substantially U-shaped to define a base, a leg and a foot for mounting in said connector body, said base of each of said prongs being received in said grooves with said foot extending over one end of said groove and said leg extending over the other end of said groove, said brushes being received within said connector body in engagement with said body portion of said prong whereby electric current can flow through said prong into said brushes to said electromagnet.

18. The actuator of claim 17, wherein said electromagnet is interconnected to a power source, said power source including a contact ring mounted to said third gear and interconnected to said electromagnet and a second housing for housing said electromagnet, said second housing being interconnected to said electromagnet and insulated from said contact ring and a pair of electrical brushes contacting said contact ring and said second housing respectively to supply electric current to said electromagnet.

19. The invention of claim 17, wherein a clutch pad means is positioned between said clutch disc and said driving assembly.

* * * * *